United States Patent
Lee et al.

(10) Patent No.: US 7,033,062 B2
(45) Date of Patent: Apr. 25, 2006

(54) LIGHT SOURCE DEVICE WITH OPTICAL GUIDING MEMBER AND PLANAR LIGHT SOURCE DEVICE EMPLOYING SAME

(75) Inventors: Chun-Yu Lee, Tu-chen (TW); Ming-Chiang Tsai, Tu-chen (TW); Tsung-Wei Jiang, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/889,829

(22) Filed: Jul. 12, 2004

(65) Prior Publication Data
US 2005/0007758 A1    Jan. 13, 2005

(30) Foreign Application Priority Data
Jul. 11, 2003  (TW) .............................. 92119083 A

(51) Int. Cl.
*F21V 7/04* (2006.01)
(52) U.S. Cl. .................. 362/609; 362/621; 362/613
(58) Field of Classification Search ............ 362/26, 362/27, 31, 800, 600, 608, 609, 610, 612, 362/613, 621; 349/63, 65
See application file for complete search history.

(56) References Cited

U.S. PATENT DOCUMENTS

| 4,779,166 | A  | * | 10/1988 | Tanaka et al. ............... 362/31 |
| 6,386,720 | B1 |   | 5/2002  | Mochizuki |
| 6,598,989 | B1 | * | 7/2003  | Huang ........................ 362/31 |
| 6,840,654 | B1 | * | 1/2005  | Guerrieri et al. ........... 362/241 |

* cited by examiner

*Primary Examiner*—Y. My Quach-Lee
(74) *Attorney, Agent, or Firm*—Wei Te Chung

(57) ABSTRACT

A planar light source device (6) for a liquid crystal display device. The planar light source device includes a light source device (2) and a light guide plate (67). The light source device includes a light-emitting element (21), and an optical guiding member (20) that is hollow and has a reflective surface. The reflective surface receives light rays emitted by the light-emitting element, and guides the light rays out from a plurality of generally aligned through holes (23) defined in a front light-emitting surface (28) of the optical guiding member. The light guide plate has a light incident surface adjacent to the light source device. The planar light source device can greatly diminish possible dark regions on the light-emitting surface of the light guide plate, and provide uniform illumination for an LCD.

9 Claims, 6 Drawing Sheets

LIGHT SOURCE DEVICE WITH OPTICAL GUIDING MEMBER AND PLANAR LIGHT SOURCE DEVICE EMPLOYING SAME

BACKGROUND OF THE INVENTION

1. Field of the Invention

The invention generally relates to a light source device and a planar light source device used in a liquid crystal display (LCD) device.

2. Prior Art

In general, an LCD device has the advantages of thinness, light weight, and low power consumption. For this reason, LCD devices are widely utilized in various types of electronic equipment, from pocket calculators to large-scale office automation equipment.

Conventionally, planar light source devices are designed for use in an LCD device for backlighting purposes. The planar light source device generally includes a light guide plate (LGP) and at least one light source. The LGP has at least one light incidence surface, and one light-emitting surface. In operation, light rays emitted by the light source(s) enter the LGP through the light incident surface(s) thereof, and are guided through the LGP to emit from the light-emitting surface. Each light source may be a linear light source or a point light source. The point light source is generally a light emitting diode (LED), which emits light rays over a region subtending an angle of about 140°. Generally, a plurality of LEDs is arranged adjacent to the light incident surface(s) of the LGP to ensure high illuminance and high uniformity of light emitting from the light-emitting surface. This kind of light source device is disclosed in U.S. Pat. No. 6,386,720 issued on May 14, 2002.

However, the lighting characteristics of ordinary LEDs are limited, and the uniformity of illumination of the planar light source device may not be sufficient. Referring to FIG. 10, a conventional planar light source device 1 utilizes two LEDs 11, 12 as light sources to illuminate an LGP 10. Each of the LEDs 11, 12 emits light rays over a region subtending an angle of about 140°. As seen, some dark regions ("shadows") A, B, C are created on a light-emitting surface of the LGP 10, because few light rays reach these regions. The number of LEDs 11, 12 can be increased to diminish the shadows A, B, C. However, this is achieved at the cost of supplying more LEDs 11, 12 and having higher power consumption.

SUMMARY OF THE INVENTION

An object of the present invention is to provide a planar light source device having high uniformity of illumination and low power consumption.

A planar light source device in accordance with the present invention comprises a light source device and a light guide plate. The light source device comprises a light-emitting element and an optical guiding member having a light-emitting surface. The optical guiding member receives light rays emitted by the light-emitting element and guides the light rays out from a plurality of aligned light-emitting exits defined in the light-emitting surface. The light guide plate has a light incident surface adjacent to the light-emitting surface of the optical guiding member.

The planar light source device can reduce or even eliminate dark regions being created on the light-emitting surface of the light guide plate, and provide uniform illumination for an associated LCD.

Other objects, advantages, and novel features of the present invention will become more apparent from the following detailed description when taken in conjunction with the accompanying drawings, in which:

DESCRIPTION OF THE PREFERRED EMBODIMENTS

Figure 1:
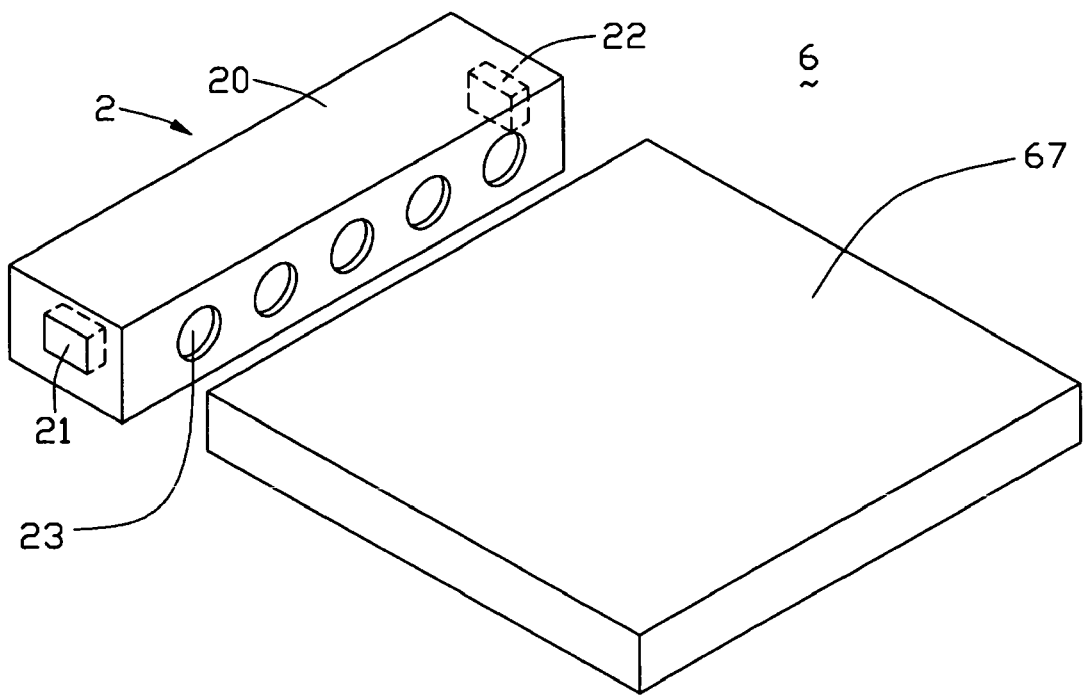
FIG. 1 is an exploded, isometric view of a first embodiment of a planar light source device according to the present invention.

Referring to FIG. 1, a planar light source device 6 according to the first embodiment of the present invention includes a transparent plate-shaped LGP 67 and a light source device 2. The light source device 2 is arranged adjacent to a light incident surface (not labeled) of the LGP 67, for providing illumination thereto.

Figure 2:
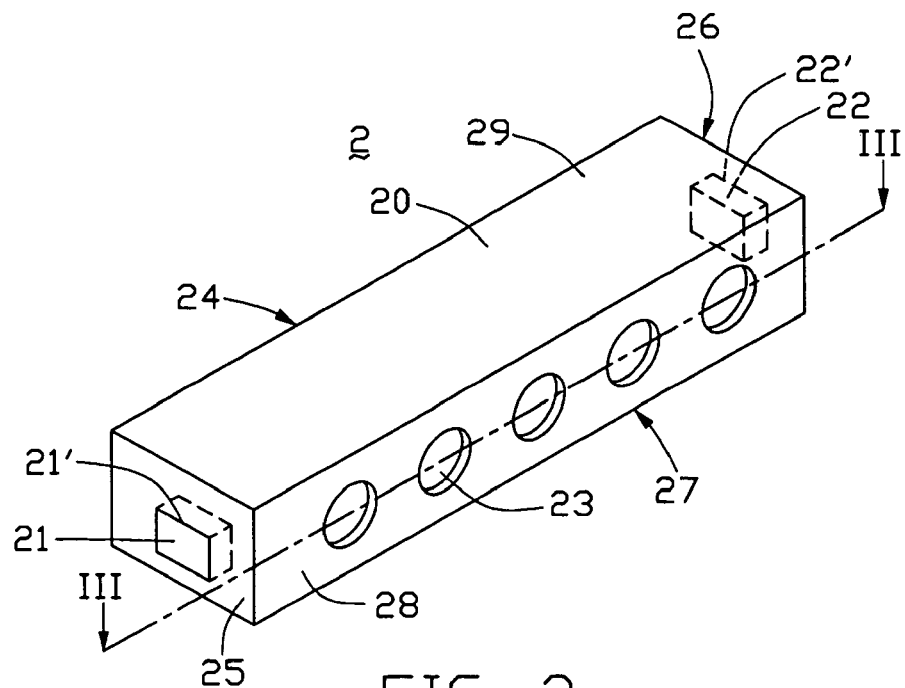
FIG. 2 is a slightly enlarged, isometric view of a light source device of the planar light source device of FIG. 1.
Figure 3:
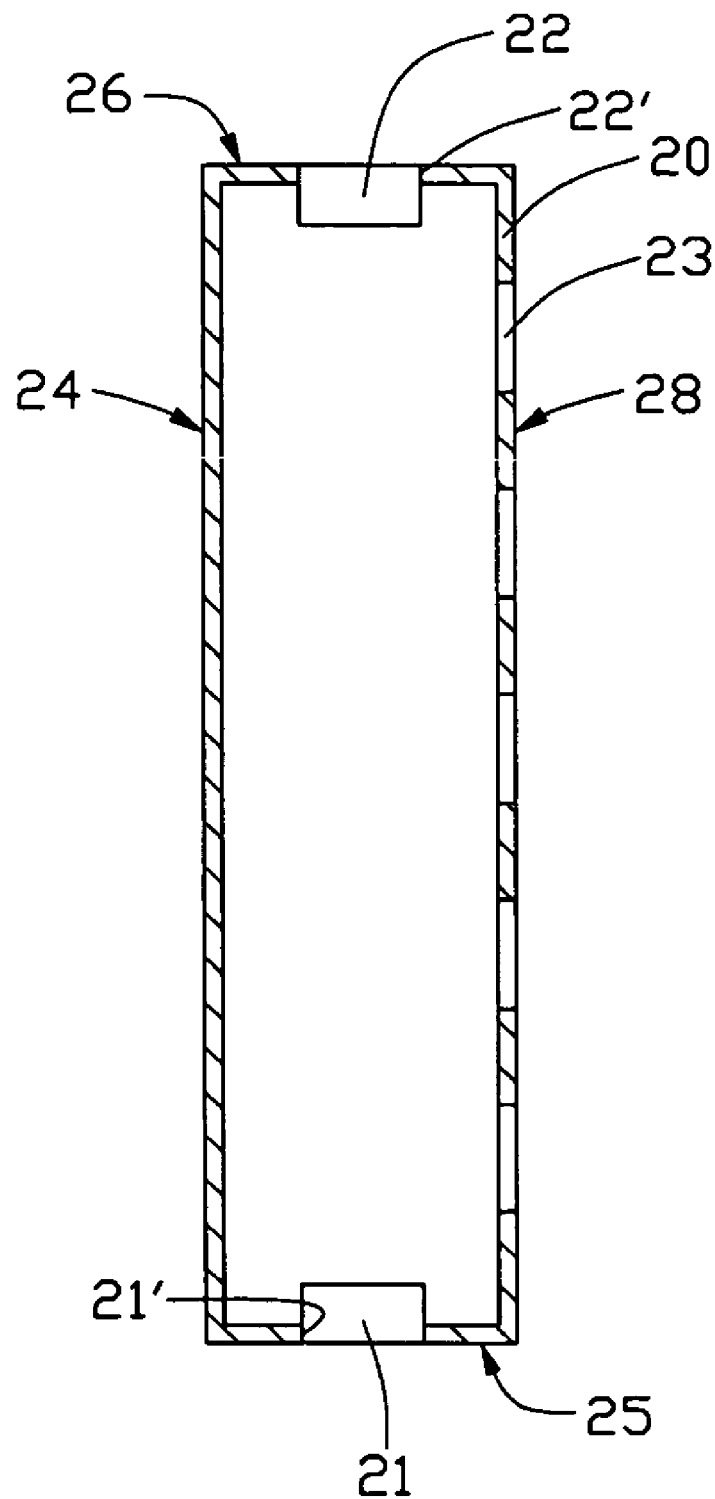
FIG. 3 is a schematic, cross-sectional view of the light source device of FIG. 2 taken along line III—III thereof.

Referring to FIGS. 2 and 3, the light source device 2 includes an optical guiding member 20 and two LEDs 21, 22. The optical guiding member 20 functions as a linear light source, and is substantially a hollow box. The optical guiding member 20 comprises a light-emitting surface 28, a back surface 24 opposite to the light-emitting surface 28, a bottom surface 27 adjoining the light-emitting surface 28, and an upper surface 29 opposite to the bottom surface 27. The optical guiding member 20 further comprises two opposite side surfaces 25, 26 adjoining the above-described surfaces 24, 27, 28, 29, and an internal light reflective surface (not labeled). A plurality of uniform, aligned through holes 23 are defined in the light-emitting surface 28 of the optical guiding member 20. The through holes 23 function as light exits. Two openings 21', 22' are defined in the side surfaces 25, 26 of the optical guiding member 20 respectively. The LEDs 21, 22 are fixed in the openings 21', 22' respectively, so that exposed faces of the LEDs 21, 22 are coplanar with the side surfaces 25, 26 respectively. Wires (not shown) connect the LEDs 21, 22 to a power source or a controller (not shown).

The light-emitting surface 28 is optically coupled with the light incident surface of the LGP 67. The through holes 23 are spaced apart at substantially equal intervals, and have substantially the same area. A length of the array of the through holes 23 is less than a length of the light incident surface of the LGP 67, and a height of each through hole 23 is less than a height of the light incident surface, so that the light source device 2 is optically coupled with the light incident surface efficiently.

In operation, light rays em it from the LEDs 21, 22 into the optical guiding member 20. The light rays are reflected any number of times by the reflective inner surface of the optical guiding member 20. The light rays then exit from the through holes 23 and enter the LGP 67. Because the light rays are randomly reflected in the optical guiding member 20, the light rays emitting therefrom have more uniform, broad radiant angles compared with the light rays emitted by the LEDs 21, 22. This reduces or even eliminates dark areas or "shadows" being created in the LGP 67. More importantly, the number of through holes 23 can be much greater than the number of LEDs 21, 22. That is, the optical guiding member 20 effectively converts the LEDs 21, 22 into a plurality of point light sources. This can greatly reduce the possibility of shadows being created in the LGP 67, and make light rays emitting from the LGP 67 more uniform.

Figure 4:
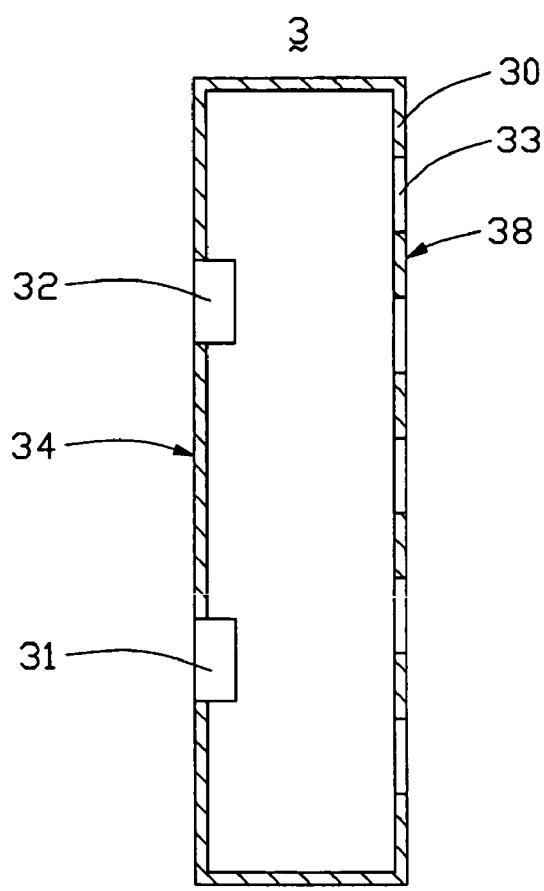
FIG. 4 is similar to FIG. 3, but showing a second embodiment of a light source device according to the present invention.

Referring to FIG. 4, in a planar light source device 3 according to the second embodiment of the present invention, two LEDs 31, 32 are fixed in a back surface 34 of an optical guiding member 30. Light rays emitted by the LEDs 31, 32 are guided by the optical guiding member 30, and emit from a light-emitting surface 38 through a plurality of through holes 33 thereof.

Figure 5:
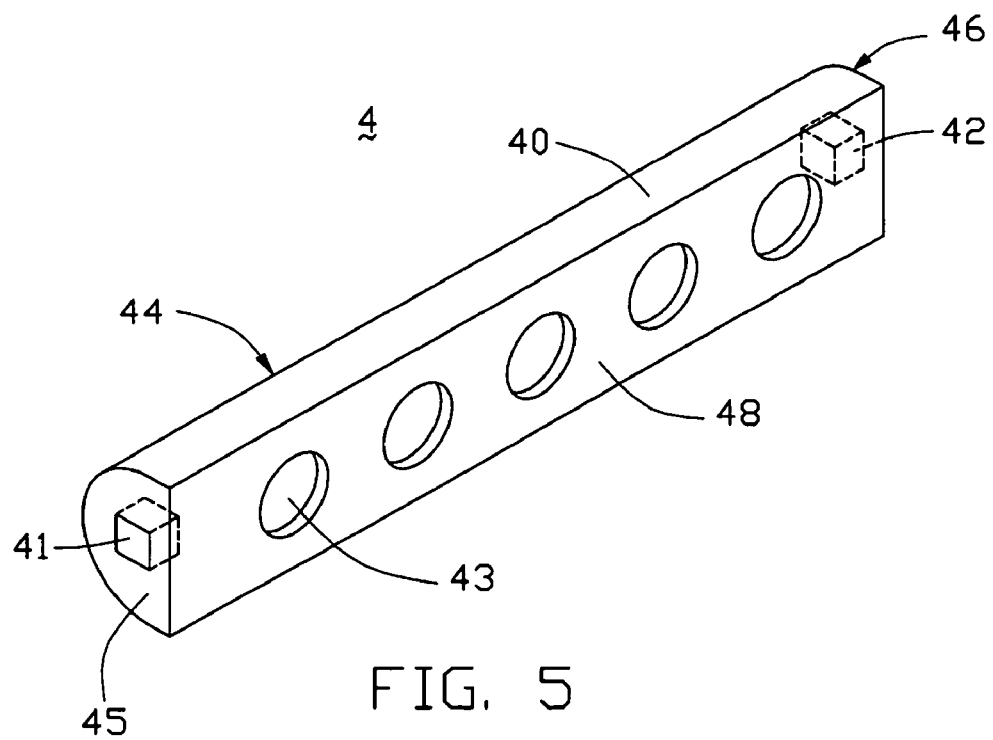
FIG. 5 is an isometric view of a third embodiment of a light source device according to the present invention.

Referring to FIG. 5, a light source device 4 according to the third embodiment of the present invention includes an optical guiding member 40, and two LEDs 41, 42. The optical guiding member 40 is substantially a hollow arch-shaped box, which comprises a planar light-emitting surface 48, an arch-shaped back surface 44 adjoining the light-emitting surface 48, and two opposite side surfaces 45, 46. The optical guiding member 40 further comprises an internal light reflective surface (not shown). A plurality of uniform, aligned through holes 43 are defined in the planar light-emitting surface 48 of the optical guiding member 40. The through holes 43 function as light exits. Two openings (not labeled) are defined in the side surfaces 45, 46 of the optical guiding member 40 respectively. The LEDs 41, 42 are fixed in the openings respectively, so that exposed faces of the LEDs 41, 42 are coplanar with the side surfaces 45, 46 respectively.

Figure 6:
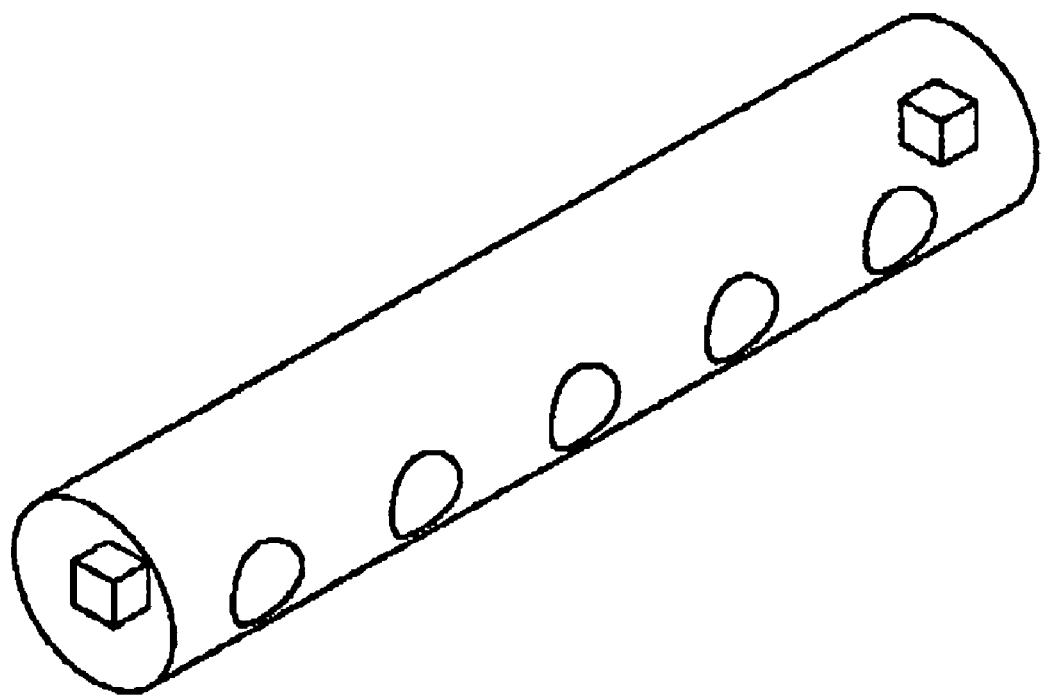
FIG. 6 is an isometric view of a fourth embodiment of a light source device according to the present invention.

Further alternative embodiments of the planar light source device according to the present invention may comprise various permutations and combinations of the above-described first through third embodiments. Still further alternative embodiments are described below:

The optical guiding member 20 (30, 40) can be replaced with a transparent, solid body having a light reflective outer surface and a plurality of aligned optical holes. The reflective outer surface reflects light rays impinging thereon until the light rays exit the optical holes. Two concavities are defined in the two opposite sides of the optical guiding member 20 (30, 40). The LEDs 21, 22 are fixed in the concavities respectively. Alternatively, the LEDs 21, 22 may be arranged adjacent to outsides of the two opposite sides respectively, such that the LEDs 21, 22 emit light rays into the optical guiding member 20 (30, 40). Further or alternatively, referring to FIG. 6, in a fourth embodiment of the present invention, the optical guiding member can be cylindrical. Similarly, the optical guiding member can be semi-cylindrical.

Figure 7:
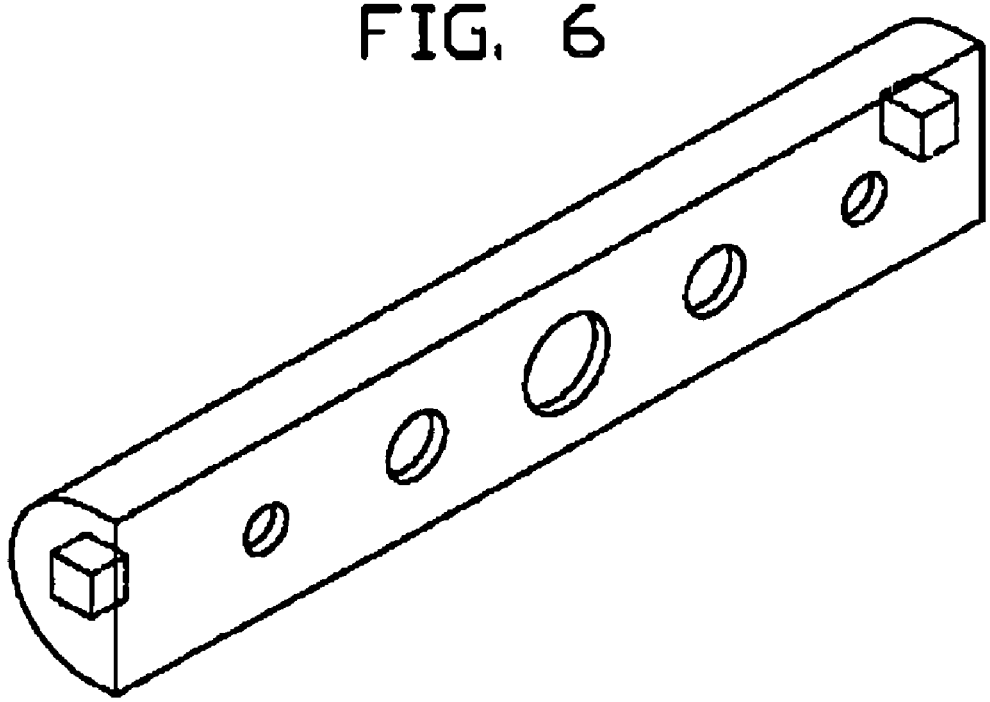
FIG. 7 is an isometric view of a fifth embodiment of a light source device according to the present invention.
Figure 8:
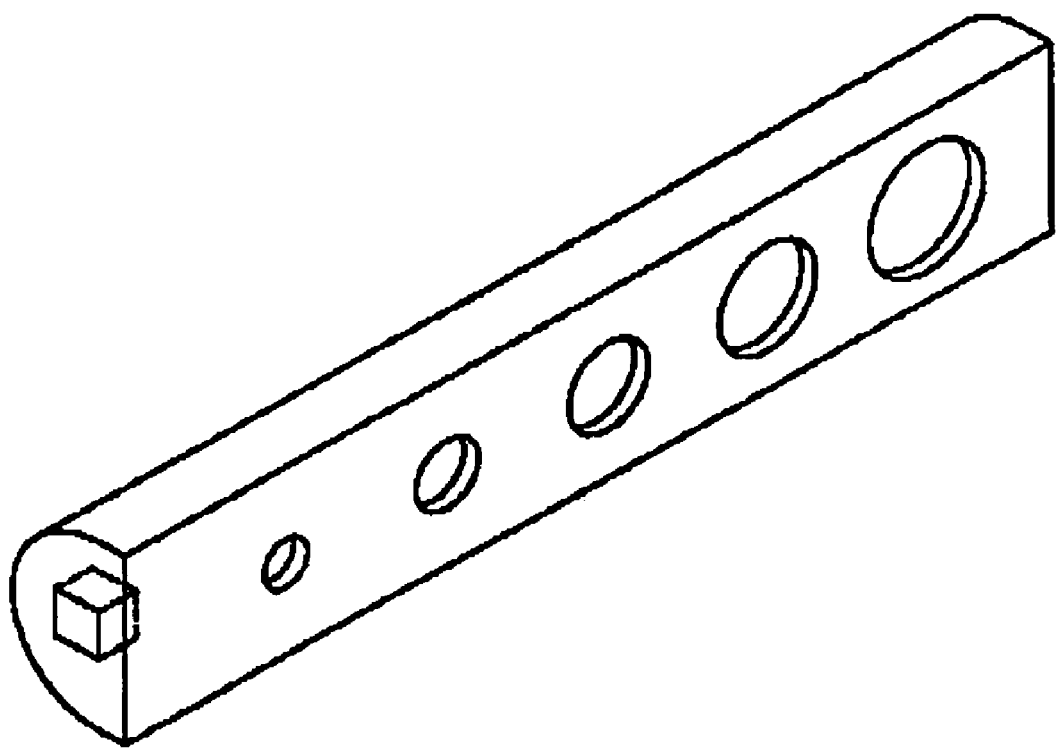
FIG. 8 is an isometric view of a sixth embodiment of a light source device according to the present invention.
Figure 9:
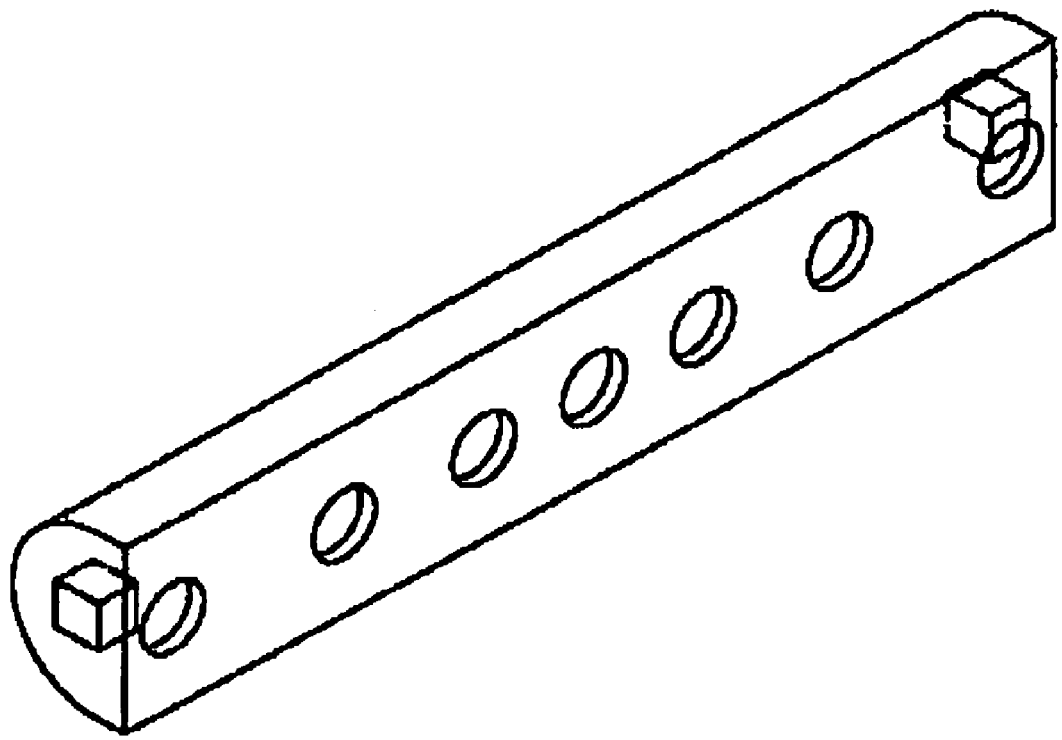
FIG. 9 is an isometric view of a seventh embodiment of a light source device according to the present invention.
Figure 10:
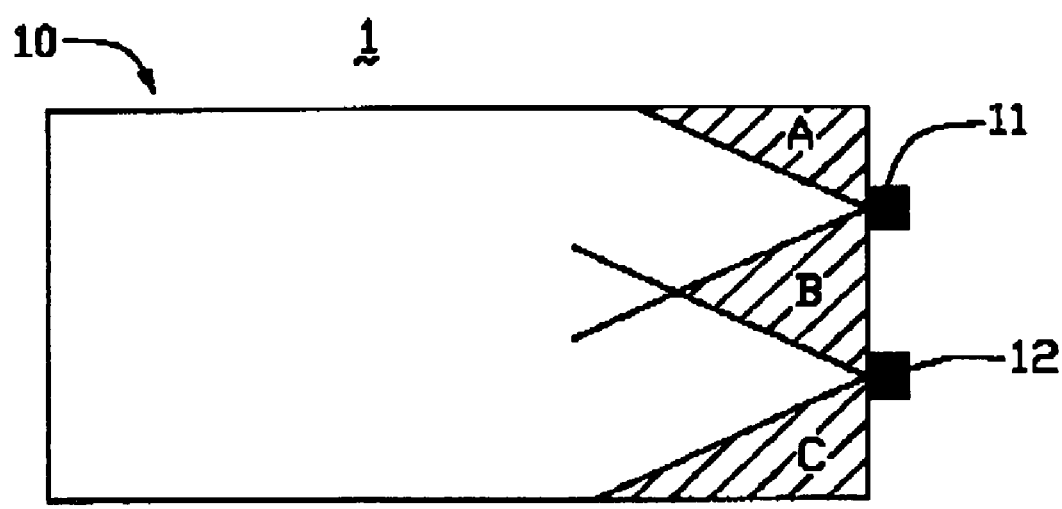
FIG. 10 is a schematic top elevation of a conventional planar light source device, showing dark regions thereof.

Referring to FIG 7. in a fifth embodiment of the present invention, the through holes can progressively increase in size from each of opposite ends of the array thereof to a center of the array. Alternatively, referring to FIG 8. in a sixth embodiment of the present invention, only one LED may be provided in the light source device. In this case, sizes of the through holes can progressively increase from an end of the array thereof adjacent to the LED to the opposite end of the array distal from the LED. Alternatively, referring to FIG 9, in a seventh embodiment of the present invention, the through holes can be arranged at different intervals apart, such that the intervals progressively decrease in length from the two opposite ends of the array to the center of the array.

The LEDs 21, 22 (31, 32, 41, 42) may be arranged adjacent to outsides of the respective side and back surfaces 25, 26 (34, 45, 46), such that the LEDs 21, 22 (31, 32, 41, 42) are optically coupled with the openings 21', 22' and emit light rays into the optical guiding member 20 (30, 40). Alternatively, the LEDs 21, 22 (31, 32, 41, 42) may be fixed in two concavities defined in the inner surface of the optical guiding member 20 (30, 40). Alternatively, more than two LEDs 21, 22 (31, 32, 41, 42) may be provided. However, the number of LEDs 21, 22 (31, 32, 41, 42) would be less than the number of through holes 23 (33, 43). In addition, an interval between any two adjacent through holes 23 (33, 43) would be smaller than an interval between two adjacent corresponding LEDs 21, 22 (31, 32, 41, 42).

It is to be further understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A light source device for emitting light beams to a light guide plate, comprising:
   a light-emitting element; and
   an optical guiding member that is hollow and has a reflective surface, the reflective surface receiving light rays emitted by the light-emitting element and guiding the light rays out from a plurality of generally aligned light-emitting exits defined in a front side of the optical guiding member;
   wherein the light-emitting exits are spaced apart at equal intervals, and sizes of the light-emitting exits progressively increase from an end of a line of light-emitting exits adjacent to the light-emitting element to an opposite end of the line of light-emitting exits distal from the light-emitting element.

2. A light source device for emitting light beams to a light guide plate, comprising:
   two spaced-apart light-emitting elements; and
   an optical guiding member that is hollow and has a reflective surface, the reflective surface receiving light rays emitted by the light-emitting elements and guiding the light rays out from a plurality of generally aligned light-emitting exits defined in a front side of the optical guiding member;
   wherein the light-emitting exits are substantially the same size, and intervals between two adjacent light-emitting exits progressively decrease in length from an end of a line of light-emitting exits adjacent to the light-emitting element to an opposite end of the line of light-emitting exits distal from the light-emitting element.

3. A light source device for emitting light beams to a light guide plate, comprising:

two or more spaced-apart light-emitting elements; and
an optical guiding member that is hollow and has a reflective surface, the reflective surface receiving light rays emitted by the light-emitting elements and guiding the light rays out from a plurality of generally aligned light-emitting exits defined in a front side of the optical guiding member;
wherein the number of light-emitting exits is greater than the number of light-emitting elements, and an interval between any two adjacent light-emitting exits is smaller than an interval between two adjacent corresponding light-emitting elements.

4. A planar light source device comprising:
a light source device comprising:
a light-emitting element; and
an optical guiding member having a reflective surface, the surface receiving light rays emitted by the light-emitting element and guiding the light rays out from a plurality of generally aligned light-emitting exits defined in a front side of the optical guiding member; and
a light guide plate having a light incident surface adjacent to the front side of the optical guiding member.

5. The planar light source device as claimed in claim 4, wherein the optical guiding member is substantially arch-shaped, cylindrical or semi-cylindrical.

6. The planar light source device as claimed in claim 4, wherein the light-emitting element is set to be associated with a second side of the optical guiding member.

7. The planar light source device as claimed in claim 4, wherein sizes of the light-emitting exits progressively increase from an end of the line of light-emitting exits adjacent to the light-emitting element to an opposite end of the line of light-emitting exits distal from the light-emitting element.

8. A planar light source device comprising:
a light source device comprising:
a light-emitting element; and
an optical guiding member receiving said light-emitting element and having an inner reflective surface reflecting light rays emitted from said light-emitting element toward a plurality of light-emitting exits defined in a first side of the optical guiding member; and
a light guide plate having a light incident surface adjacent to said first side of the optical guiding member.

9. The planar light source device as claimed in claim 8, wherein said light-emitting element is located on a second side of the optical guiding member, and said second side does not face toward said first side.

* * * * *